May 6, 1958 I. I. MERKUR 2,833,350
FILM CUTTING APPARATUS
Filed Jan. 24, 1955 2 Sheets-Sheet 1
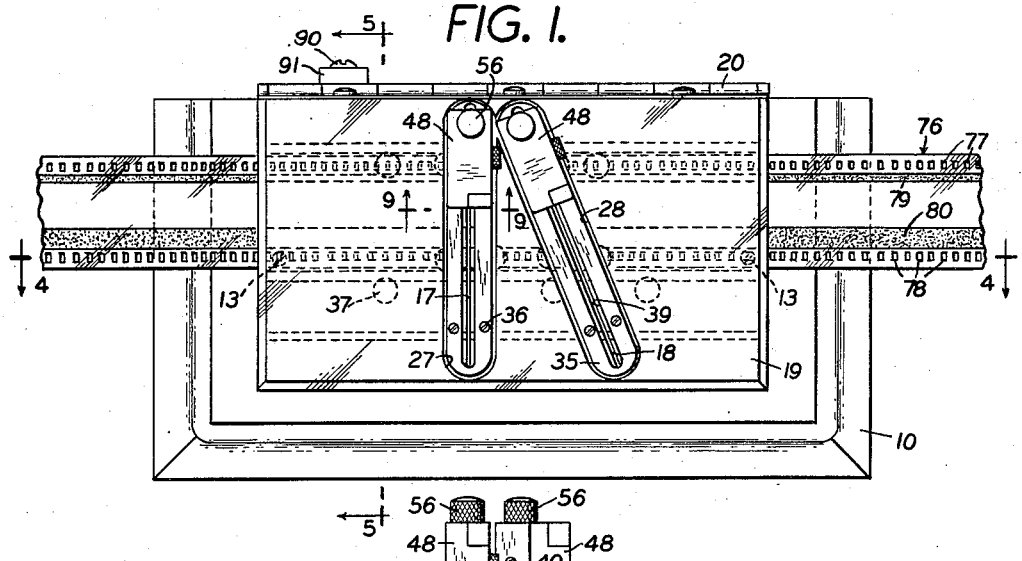
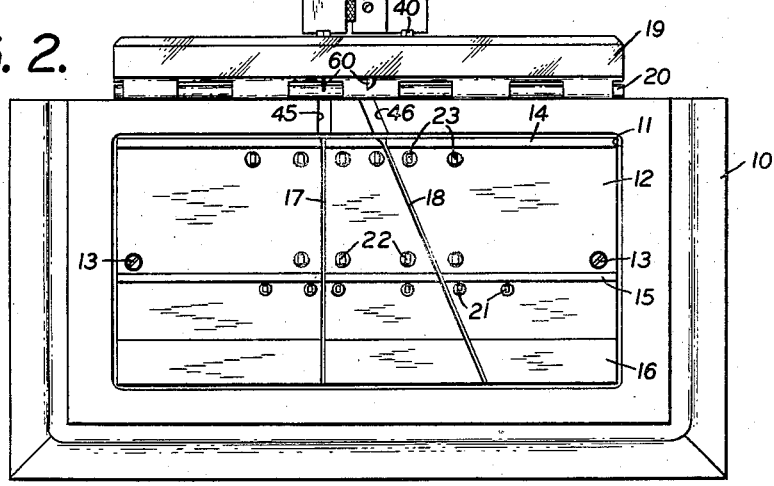
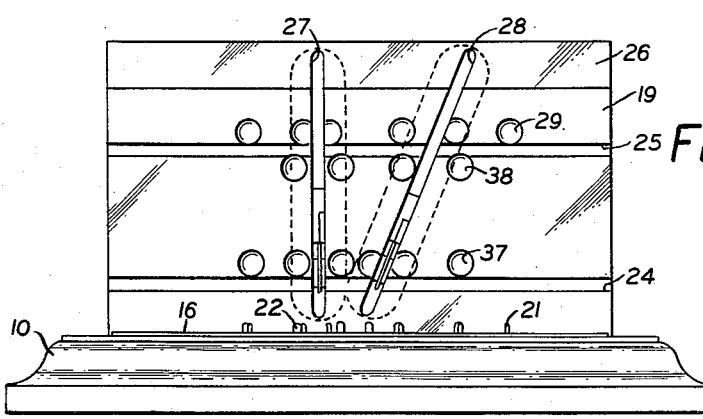
INVENTOR
IRVING I. MERKUR.
BY Mock & Blum
ATTORNEYS.

May 6, 1958     I. I. MERKUR     2,833,350
FILM CUTTING APPARATUS
Filed Jan. 24, 1955                 2 Sheets-Sheet 2
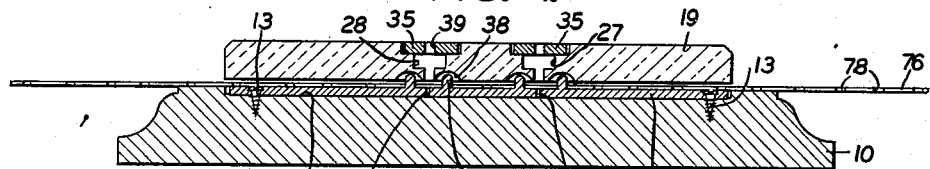
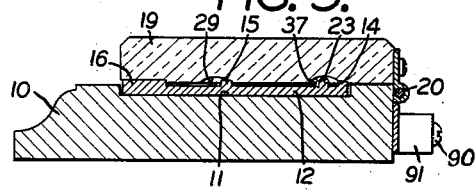
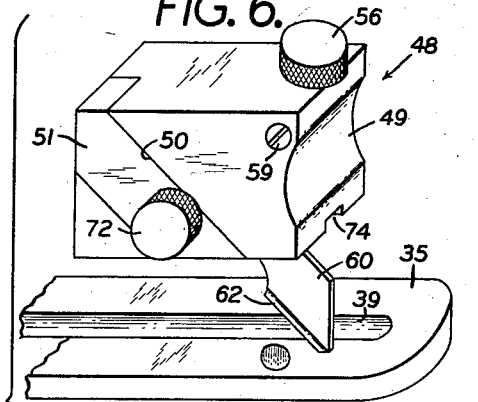
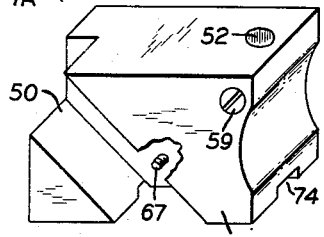
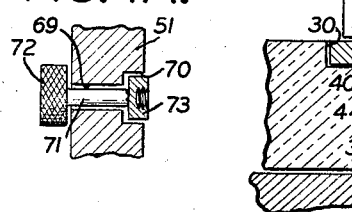
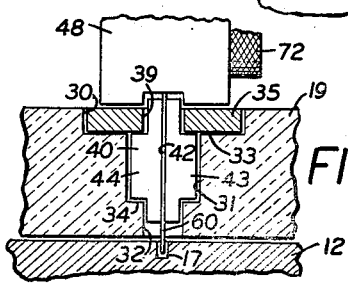
INVENTOR
IRVING I. MERKUR.
BY Mock + Blum
ATTORNEYS.

2,833,350

FILM CUTTING APPARATUS

Irving I. Merkur, Bronx, N. Y.

Application January 24, 1955, Serial No. 483,753

1 Claim. (Cl. 164—73)

This invention relates to film splicing apparatus and more particularly to a cutting and slicing device for acetate film having one or more magnetic sound tracks thereon.

It has heretofore been difficult to edit and splice film containing a magnetic sound track for the reason that the metal parts of the usual splicers will demagnetize the sound track on the film upon contact, therefore interfering with the continuity of the sound. In addition, the presence of a sound track on the film requires butt-joint splicing of the film, since overlapping of the spliced edges produces unwanted noises and other sound distortions. The use of the butt-joint in turn requires a very accurate cutting or trimming of the matching edges of the film to be spliced.

It is an object of the present invention to provide a film splicer of the type described in which all parts contacting the film are made of a magnetically impermeable material so that they will not demagnetize any part of the magnetic sound track.

Another object of the invention is the provision of a film splicer of the type described in which slidable cutting elements are provided to insure accurate cutting or trimming of the film edges.

A further object of the invention is the provision of the film splicer of the type described in which guide means for holding the film sections are provided to insure accurate alinement of the film at the joint.

Other objects and advantages of this invention will be apparent in the course of the following specification when taken in connection with the accompanying drawings in which:

Fig. 1 is a top plan view of the splicer with its cover in closed or operative position, and showing a section of film in position to be spliced;

Fig. 2 is a top plan view similar to Fig. 1 but showing the cover in its open or inoperative position and the film removed;

Fig. 3 is a front elevation of the film splicer showing the cover in raised or inoperative position and revealing the inner surface of the cover;

Fig. 4 is a section taken along line 4—4 of Fig. 1;

Fig. 5 is a section taken along line 5—5 of Fig. 1;

Fig. 6 is an enlarged exploded perspective view showing the cutting block, its slide member, guide member, and a portion of the cover;

Fig. 7 is an enlarged exploded perspective view of the cutting block and parts thereof;

Fig. 7a is a section along line 7a—7a of Fig. 7.

Fig. 8 is an enlarged top plan view showing a section of film mounted in the splicer and in the process of being spliced; and Fig. 9 is a section taken along line 9—9 of Fig. 1.

Referring in detail to the drawings, the film splicer comprises a base 10 of generally rectangular shape and preferably made of wood, although it may also be made of plastic or composition material which is magnetically impermeable. The base 10 has in its top surface a rectangular recess or well 11 for receiving a base plate 12 which acts as the working surface of the splicer. The base plate 12 is made of a magnetically impermeable metal such as stainless steel, bronze, or the like, and is secured within the well 11 by screws 13 which are also made of a magnetically impermeable metal. As will be observed in Figs. 4 and 5, the base plate is of such a thickness that its top surface lies substantially flush with the top surface of the base 10. The base plate 12 has an integral upstanding rib 14 extending along the length of one edge thereof and a second integral upstanding rib 15 parallel to and spaced from said rib 14. The base plate 12 also has an integral upstanding rib 16 of greater width extending along its other longitudinal edge and parallel to ribs 14 and 15. The ribs 14, 15 and 16 act as guides for alining the film during the cutting and splicing operations and for this purpose the ribs 14 and 15 are spaced apart by a distance of 35 millimeters to accommodate the usual 35 millimeter film therebetween, while the ribs 15 and 16 are spaced apart by a distance of 16 millimeters to accommodate 16 millimeter film therebetween.

A pair of spaced narrow grooves or slots 17 and 18 are located in the top surface of the base plate 12, extending the width of the base plate 12 and extending downwardly a short distance into said base plate. The grooves 17 and 18 also extend through the body of the ribs 14, 15 and 16. The grooves 17 and 18 are intended to permit passage of the cutting knives through the film, as will be presently described. The transverse groove 17 is exactly perpendicular to the ribs 14, 15 and 16, while the groove 18 extends angularly with relation to said ribs 14, 15 and 16.

The base plate 12 also includes a plurality of upstanding film centering pins located and spaced to receive the sprocket holes of the film to be spliced. A row of these pins 23 extends adjacent to and parallel to the rib 14. Respective rows of centering pins 21 and 22 are located on either side of the rib 15. The two rows of centering pins 22 and 23 are positioned to extend into the sprocket holes at either edge of a length of 35 millimeter film when the film is inserted in the space between the ribs 14 and 15 to hold the film securely against longitudinal movement. Similarly the row of centering pins 21 is located to extend into a row of sprocket holes at the edge of a length of 16 millimeter film when the film is inserted in the space between the ribs 15 and 16. It will be observed that in each respective row a centering pin is closely adjacent each side of both grooves 17 and 18 so that the film is securely held adjacent the line on which it is to be cut.

The splicer also includes a cover 19 made of a single relatively thick rectangular piece of rigid transparent plastic material such as methyl methacrylate of substantially the same length as base plate 12. A hinge 20 connects the cover 19 and base 10 with the rear edge of the cover 19 in flush abutment with the rear edge of the base 10, as clearly shown in Fig. 5. The hinge 20 permits the cover 19 to be pivoted between a closed position shown in Figs. 1, 4 and 5, in which the cover lies flat upon the top surface of base plate 12, and an open position shown in Fig. 2, in which the cover 19 is raised perpendicularly beyond the rear edge of base 10. As shown most clearly in Fig. 3, the cover 19 has on its bottom surface a pair of recessed longitudinal grooves 24 and 25 and a recessed or undercut front edge portion 26 adapted to receive respectively the upstanding base plate ribs 14, 15 and 16 when the cover 19 is in its closed position with the bottom surface of cover 19 resting flushly upon the top surface of base plate 12. For the same purpose, the bottom surface of cover 19 has respective rows of recessed circular depressions 37, 38 and 29 which are respectively adapted to receive the rows of centering pins 23, 22 and 21. The circular depressions 37, 38 and 29 are of appreciably larger diameter than the centering pins 23, 22 and 21 so that they have the additional function of alining the sprocket holes of the film on the pins and pressing the pins through the sprocket holes if the film is not originally set with the sprocket holes in the exact registry with said centering pins.

The cover 19 has a pair of knife guiding slots 27 and 28 which, in the closed position of said cover, are in exact alinement with the grooves 17 and 18 of the base plate 12. The slots 27 and 28 are of identical construction and, as shown in Fig. 9, each comprises a relatively wide top section 30, a narrower intermediate section 31, and a bottom section 32 which is narrower than the intermediate section 31. The sections 31 and 32 each define respective ledges or shoulders 33 and 34. A metal guide plate 35 is seated snugly within the top section 30 on the shoulder 33, with its top edge flush with the top surface of cover 19, and is secured in this seated position by screws 36. The guide plate 35 has a longitudinal slot 39 of substantially the same length and the same width as the bottom section 32 of the respective slot 27 or 28. A slide member 40 is mounted for longitudinal sliding movement in each of the slots 27 and 28. Each said slide member 40 comprises a flat body member 41 having a diagonally-extending knife-receiving slot 42 therein. The slot 42 opens at the front edge, the bottom edge, the lower rear edge and the forward top edge of the body portion 41. The body portion 41 has integral rectangular lateral projections 43 and 44 on either side thereof, the projections being of the same height as the intermediate slot section 31. The slide member body portion 41 is of sufficient width to slide snugly within the guide plate slot 39, and also within the bottom slot section 32, while the lateral projections 43 and 44 fit snugly and slide within the intermediate slot section 31.

The slide member 40 is mounted by inserting it into one of the slots 27 or 28 with the bottom end of its body portion 41 extending into the bottom slot section 32, the projections 43 and 44 extending into the intermediate slot section 31 and the upper body portion 41 extending centrally in the upper slot section 30. In this position, the bottom edges of the projections 43 and 44 rest upon the ledge 34 so that the slide member cannot move downwardly in the slot 27 or 28. The guide plate 35 is then inserted in the upper slot section 30 so that it rests upon the ledge 33 and the upper body portion 41 of the slide member extends slidably through the slot 39 in the guide plate. When the guide plate is now secured in its inserted position by means of the screws 36, it acts as a stop to prevent the slide member 40 from being lifted upwardly out of its mounted position. As shown in Fig. 9, the upper edge of the slide member body portion 41 extends a slight distance above the top edge of the guide plate 35 and has a threaded bore 47 therein for attachment of the knife carrier thereto.

The knife carrier 48 comprises a solid rectangular metal block 49 having a diagonal slot 50 at one side thereof and extending through half the width of said block 49. A clamping piece 51 is provided to be inserted within the slot 50 and is shaped to complete the rectangular contour of the block 49.

The block 49 has at its forward end a through-and-through vertical bore 52 for receiving a mounting pin 53. The mounting pin 53 has a shaft 54 whose bottom end 55 is threaded. A knurled finger piece 56 is secured to the top of shaft 54. A cylindrical collar 57 is secured to the shaft 54 immediately below the finger piece 56, while a second cylindrical collar 58 is secured to the shaft 54 immediately above the threaded portion 55. The block 49 also has a set screw 59 extending through a side wall thereof and extending into the bore 52. When the mounting pin 53 is inserted into the bore 52, the set screw 59 is turned inwardly until it barely touches the portion of the shaft 54 between the collars 57 and 58. The set screw thus operates to enable the mounting screw 56 to be raised and lowered a limited distance within the bore 52 but at the same time preventing the mounting screw 53 from being withdrawn entirely from the bore 52.

The knife carrier 48 is adapted to mount a knife blade 60, shown in Fig. 7, which comprises a body portion 61 having cutting edges 62 and 63 separated by a cut-away portion 64. A pair of through mounting holes 65 and 66 are respectively located adjacent the cutting edges 62 and 63. The holes 65 and 66 are each sized to receive the end of a screw 67 which extends into the slot 50 for mounting the blade 60 on the block 49. When the hole 66 is mounted on the screw 67, for example, the blade 60 extends angularly below and toward the rear of the block 49. In this mounted position, the cutting edge 62 is located at the rear of the block 49 with its rear edge in vertical alinement with the rear edge of the block 49, as shown in Fig. 6. The other cutting edge 63 is located within the slot 50. In this connection, it should be noted that the width of the cutting blade adjacent the cutting edges 62 and 63 is equal to the width of the slot 50 so that when the cutting blade is mounted within the slot 50 one cutting edge of the blade 60 and the opposite longitudinal edge of said blade abut the opposite walls of slot 50 and prevent any pivoting movement of the blade 60 about the screw 67. The blade 60 is reversible within the slot 50 so that either of its cutting edges may be utilized, and for this purpose either of the holes 65 or 66 may be mounted upon the screw 67.

The clamping member 51 has a through bore 69, shown in Fig. 7a, which has a bore extension 70 of enlarged diameter at one end. A fastening member is mounted in said bore 69 and extension 70, the fastening member comprising a cylindrical shaft 71 having a knurled finger piece 72 at one end and a circular nut 73 secured at the other end for rotation therewith. The circular nut 73 fits within the enlarged bore extension 70 and is of greater diameter than the bore 69 so that it may move back and forth a limited distance through the length of bore extension 70 but may not be removed entirely from the bore 69. The circular nut 73 is internally threaded to fit the screw 67. When the knife blade 60 is mounted upon the screw 67 in the slot 50, the clamping member 51 is inserted in position in the slot 50 and the finger piece 72 is rotated to secure the nut 73 to screw 67, thereby clamping the blade 60 rigidly in its mounted position.

The block 49 has a longitudinal undercut slot 74 extending the length of its bottom surface, said slot 74 being sized to receive the upper end of the slide member 40. In mounting the knife carrier 48, the block 49 is placed upon the slide member 40 with the upper body portion 41 of said slide member extending into the slot 74 and the mounted knife blade 60 extending through the diagonal slot 42 of said slide member. In this position the threaded bore 47 of the slide member is located directly beneath and in registry with the threaded end 55 of the mounting screw 53 so that when the finger piece 56 is rotated the knife carrier 48 is rigidly mounted upon the slide member 40. It is to be understood that a knife carrier 48 may be mounted upon slide members 40 located in each of the slots 27 and 28 of the cover 19, as shown in Figs. 1 and 2.

When the cover 19 is raised the weight of the knife carriers 48 cause them to drop to the rear ends of the slots 27 and 28, that is, the end adjacent the hinge 20, as shown in Fig. 3. In order to permit the cover 19 to be pivoted downwardly to its closed position from this raised position, the base 10 is provided with depressed slots 45 and 46 communicating with the ends of base plate grooves 17 and 18. When the cover is pivoted to its closed position, as shown in Figs. 1, 4 and 5, the knife blades are received within the slots 45 and 46 to permit the cover 19 to lie flush upon the base plate 12.

The operation of the device is as follows:

When it is desired to edit a length of film in order to remove a selected portion of the sound track, the film is placed upon the upstanding centering pins 23, 22 or 21. Fig. 1 shows, by way of example, a length of 35 millimeter film 76 having the usual rows of sprocket holes 77 and 78 along its opposite edges. The film 76 is of the usual cellulose acetate type and bears a pair of spaced sound tracks 79 and 80, both sound tracks consisting of a magnetized metallic coating, as is well known in the art. The film 76 is placed between the upstanding ribs 14 and 15 of the base plate 12 with the centering pins 23 extending through the row of sprocket holes 77 and the row of centering pins 22 extending through the row of sprocket holes 78. The cover 19 is then closed, causing the circular depressions 27 and 28 to press the centering pins 23 and 22 firmly through the sprocket holes 77 and 78, and also bringing the ends of the knife blades 60 into the base slots 45 and 46. One of the knife carriers 48 is then slid forwardly into the slot 27 or 28, moving the tip of its cutting edge through the base plate groove 17 or 18 and causing the cutting edge to slice through the film section mounted on the centering pins, thereby producing a neat and accurate cut. The knife carrier 48 of slot 27 is used if a straight or perpendicular cut is desired while the knife carrier 48 in slot 28 is used if a diagonal cut is desired. In either event, the film section is then removed from the centering pins and moved until the other end of the sound track to be eliminated is in alinement with the knife. The cutting operation is then repeated using the same knife carrier.

The film is now ready to be spliced and for this purpose the cut ends of the film are mounted on the centering pins 23 and 22 in the manner shown in Fig. 8, with their cut edges 81 and 82 in flush abutment with each other. A piece of transparent cellulose mending tape may now be used to join the cut sections, but it is preferred to use the commercially-available type of splicing tape 83 which has the same width as the film and is provided with matching sprocket holes 84 at each edge.

It is to be understood that in the splicing of 16 millimeter film the identical operation is performed, except that the film is placed between the ribs 15 and 16 and is mounted on the centering pins 21.

The knife carriers 48 and all of their parts are made of stainless steel, bronze, or other non-magnetic metal, as well as the guide plates 35 and the slide members 40. Thus, there are no parts of the splicer which can remove portions of the magnetic sound track upon contact with the film.

One or more of the screws 90 which connect the lower section of hinge 20 to the base 10 may pass through a block 91 to mount said block on the rear wall of said base. The block or blocks 91 then serve as stops to prevent rearward pivoting of the cover 19 past its vertically-raised position of Figs. 2 and 3.

Because the base plate 12 is flush with the top surface of the base 10, the mounted film will not be creased or warped when the cover 19 is brought to its closed position upon the film.

While a preferred embodiment of the invention has been shown and described herein, it is obvious that numerous omissions, changes and additions may be made in this preferred embodiment without departing from the spirit and scope of the invention.

What is claimed is:

In a film splicer, a base having a planar upper surface, at least one rib upstanding from said upper surface and extending the length thereof and defining an abutment shoulder for film resting on said upper surface, a plurality of centering pins upstanding from said upper surface and positioned to enter sprocket holes of film mounted on said upper surface and against the shoulder, a cover hinged to said base and movable between a closed position in which it rests flush upon the upper surface of said base and an open position in which it is disposed clear of said upper surface, said cover in its closed position being substantially co-extensive with and in registration with said base and being adapted to clamp the mounted film against said upper surface, said cover having recesses in its bottom surface sized and positioned to receive the rib and pins when the cover is closed, said cover also having a through guide slot positioned and adapted to extend in a direction crosswise of the width of the mounted film and being of greater length than the width of the mounted film, a knife member slidably mounted in said guide slot for movement along the axis of said guide slot, said knife member projecting above the top surface of said cover and having a blade depending below said guide slot, said base having a cutting slot in the upper surface thereof, said cutting slot being axially alined with the guide slot of said cover, said knife blade being positioned and adapted to extend slidably into said cutting slot in the closed position of said cover, said knife blade being adapted to cut the mounted film upon closing the cover and by sliding the knife member through the guide slot and over the film.

References Cited in the file of this patent

UNITED STATES PATENTS

| | | |
|---|---|---|
| 10,132 | Griswold | Oct. 18, 1853 |
| 107,248 | Goodfellow | Sept. 13, 1870 |
| 184,769 | Ferris | Nov. 28, 1876 |
| 234,476 | Hood | Nov. 16, 1880 |
| 1,117,577 | Johnson | Nov. 17, 1914 |
| 1,356,761 | Griswold | Oct. 26, 1920 |
| 1,434,475 | Austin | Nov. 7, 1922 |
| 1,464,265 | Griswold | Aug. 7, 1923 |
| 1,852,170 | Lile | Apr. 5, 1932 |
| 2,023,911 | Boughton | Dec. 10, 1935 |
| 2,305,339 | Deutscher | Dec. 15, 1942 |
| 2,316,205 | Williams | Apr. 13, 1943 |
| 2,696,867 | Wensink | Dec. 14, 1954 |
| 2,724,436 | Constantine | Nov. 22, 1955 |